(12) United States Patent
Seo et al.

(10) Patent No.: US 12,292,054 B2
(45) Date of Patent: May 6, 2025

(54) MOTOR CONTROL DEVICE

(71) Applicant: DENSO CORPORATION, Kariya (JP)

(72) Inventors: Yuichi Seo, Kariya (JP); Yuuji Hidaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 52 days.

(21) Appl. No.: 18/324,247

(22) Filed: May 26, 2023

(65) Prior Publication Data

US 2024/0044338 A1    Feb. 8, 2024

(30) Foreign Application Priority Data

Aug. 3, 2022   (JP) .................................. 2022-123990

(51) Int. Cl.
| | |
|---|---|
| F04D 27/02 | (2006.01) |
| F02D 41/30 | (2006.01) |
| F02M 37/20 | (2006.01) |
| F04D 15/00 | (2006.01) |
| F04D 15/02 | (2006.01) |
| H02P 29/032 | (2016.01) |

(52) U.S. Cl.
CPC ..... *F04D 27/0261* (2013.01); *F02D 41/3082* (2013.01); *F02M 37/20* (2013.01); *F04D 15/0066* (2013.01); *F04D 15/0088* (2013.01); *F04D 15/02* (2013.01); *H02P 29/032* (2016.02)

(58) Field of Classification Search
CPC .. F04D 27/0261; F04D 5/002; F04D 15/0077; F04D 15/0088; F04D 13/06; F04D 15/0066; F04D 15/02; H02P 29/032; H02P 29/024; F02D 41/3082; F02D 33/003; F02M 37/08; F02M 37/10; F02M 37/20
See application file for complete search history.

(56) References Cited

U.S. PATENT DOCUMENTS

| | | | | |
|---|---|---|---|---|
| 5,662,455 | A | * | 9/1997 | Iwata ...................... F04D 9/002 |
| | | | | 415/55.1 |
| 11,208,963 | B1 | * | 12/2021 | Dudar ................. F02D 41/0045 |
| 2016/0208747 | A1 | * | 7/2016 | Hidaka ................... F04D 13/06 |
| 2016/0319784 | A1 | * | 11/2016 | Yamada ................. F02M 37/10 |
| 2023/0167791 | A1 | * | 6/2023 | Tanida ................... F02M 37/10 |
| | | | | 123/497 |

FOREIGN PATENT DOCUMENTS

| | | | | |
|---|---|---|---|---|
| DE | 102021128602 | A1 * | 5/2022 | ......... F02D 41/0045 |
| JP | 2017-137874 | A | 8/2017 | |
| JP | 2021-019398 | A | 2/2021 | |
| JP | WO2021024302 | A1 * | 11/2021 | |

OTHER PUBLICATIONS

U.S. Appl. No. 18/324,222, filed May 26, 2023, Seo et al.
U.S. Appl. No. 18/324,241, filed May 26, 2023, Seo et al.

* cited by examiner

*Primary Examiner* — Dominick L Plakkoottam

(74) *Attorney, Agent, or Firm* — Posz Law Group, PLC

(57) ABSTRACT

A motor control device configured to control a motor that drives a fuel pump includes a sign detection unit and a vapor suppression unit. The sign detection unit is configured to detect a sign of a vapor lock that is an abnormality in which the fuel pump is unable to discharge a fuel due to a vapor inside the fuel pump. The vapor suppression unit is configured to change a rotation speed of the motor to reduce the vapor inside the fuel pump when the sign detection unit detects the sign of the vapor lock.

12 Claims, 8 Drawing Sheets

MOTOR CONTROL DEVICE

CROSS REFERENCE TO RELATED APPLICATION

This application is based on Japanese Patent Application No. 2022-123990 filed on Aug. 3, 2022, the disclosure of which is incorporated herein by reference.

TECHNICAL FIELD

The present disclosure relates to a motor control device that controls a motor.

BACKGROUND

A fuel pump controller recovers a fuel pump from a vapor lock state, when a pressure of fuel discharged by the fuel pump falls below a predetermined threshold, by switching a feedback control to a feedforward control.

SUMMARY

A motor control device is configured to control a motor that drives a fuel pump, and includes: a sign detection unit configured to detect a sign of a vapor lock that is an abnormality in which the fuel pump is unable to discharge a fuel due to a vapor inside the fuel pump; and a vapor suppression unit configured to change a rotation speed of the motor to reduce the vapor inside the fuel pump when the sign detection unit detects the sign of the vapor lock.

DETAILED DESCRIPTION

When the pressure of fuel discharged by a fuel pump falls below a predetermined threshold, it is determined that vapor has occurred in the fuel pump. A fuel pump controller recovers the fuel pump from the vapor lock state by switching the control of a motor that drives the fuel pump from a feedback control to a feedforward control.

As a result of detailed examination by the inventors, it is difficult to recover the fuel pump from the vapor lock state depending on the state of the fuel. In this case, the fuel pump becomes unable to pump fuel.

The present disclosure provides a motor control device to improve the reliability of a fuel pump.

According to one aspect of the present disclosure, a motor control device is configured to control a motor that drives a fuel pump, and includes a sign detection unit and a vapor suppression unit.

The sign detection unit is configured to detect a sign of a vapor lock that is an abnormality in which the fuel pump is unable to discharge a fuel due to a vapor inside the fuel pump.

The vapor suppression unit is configured to change a rotation speed of the motor to reduce the vapor inside the fuel pump when the sign detection unit detects the sign of the vapor lock.

The motor control device can execute measures to avoid the vapor lock before the occurrence of vapor lock. Therefore, the occurrence of vapor lock can be suppressed effectively compared with a case where the measures are taken after the occurrence of vapor lock. As a result, the motor control device of the present disclosure can suppress the occurrence of a situation in which the fuel pump cannot pump up fuel, and can improve the reliability of the fuel pump.

First Embodiment

Figure 1:
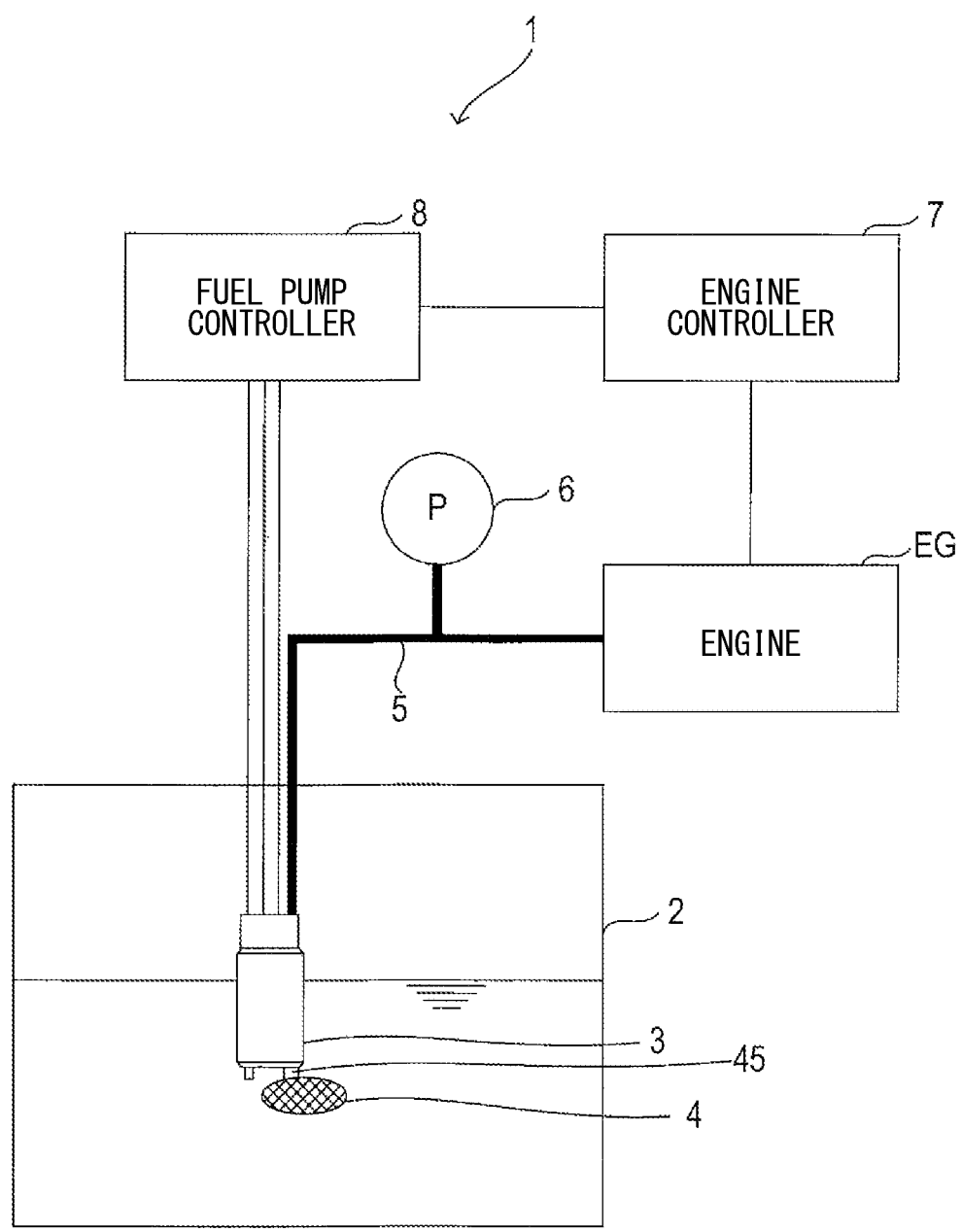
FIG. 1 is a block diagram illustrating a configuration of a fuel supply system.

Hereinafter, a first embodiment of the present disclosure will be described with reference to the drawings. The fuel supply system 1 of the present embodiment is mounted on a vehicle. As shown in FIG. 1, the fuel supply system 1 includes a fuel tank 2, a fuel pump 3, a suction filter 4, a fuel pipe 5, a pressure sensor 6, an engine controller 7, and a fuel pump controller 8.

The fuel tank 2 stores fuel to be supplied to the engine EG of the vehicle. The engine EG includes multiple injectors respectively corresponding to the multiple cylinders. The injectors inject fuel into the cylinders respectively.

The fuel pump 3 is installed inside the fuel tank 2 and pumps up the fuel stored in the fuel tank 2. The suction filter 4 is installed near the suction hole 45 of the fuel pump 3 in the fuel tank 2 and removes foreign matters from the fuel sucked by the fuel pump 3 by collecting foreign matters in the fuel.

The fuel pipe 5 supplies the fuel from the fuel pump 3 to the engine EG. The pressure sensor 6 detects the pressure of fuel flowing through the fuel pipe 5 and outputs a pressure detection signal indicating the detection result.

The engine controller 7 drives the injectors to control fuel injection to the engine EG. The engine controller 7 controls the fuel pump 3 via the fuel pump controller 8 so that the fuel pressure indicated by the pressure detection signal acquired from the pressure sensor 6 matches the target fuel pressure.

Figure 2:
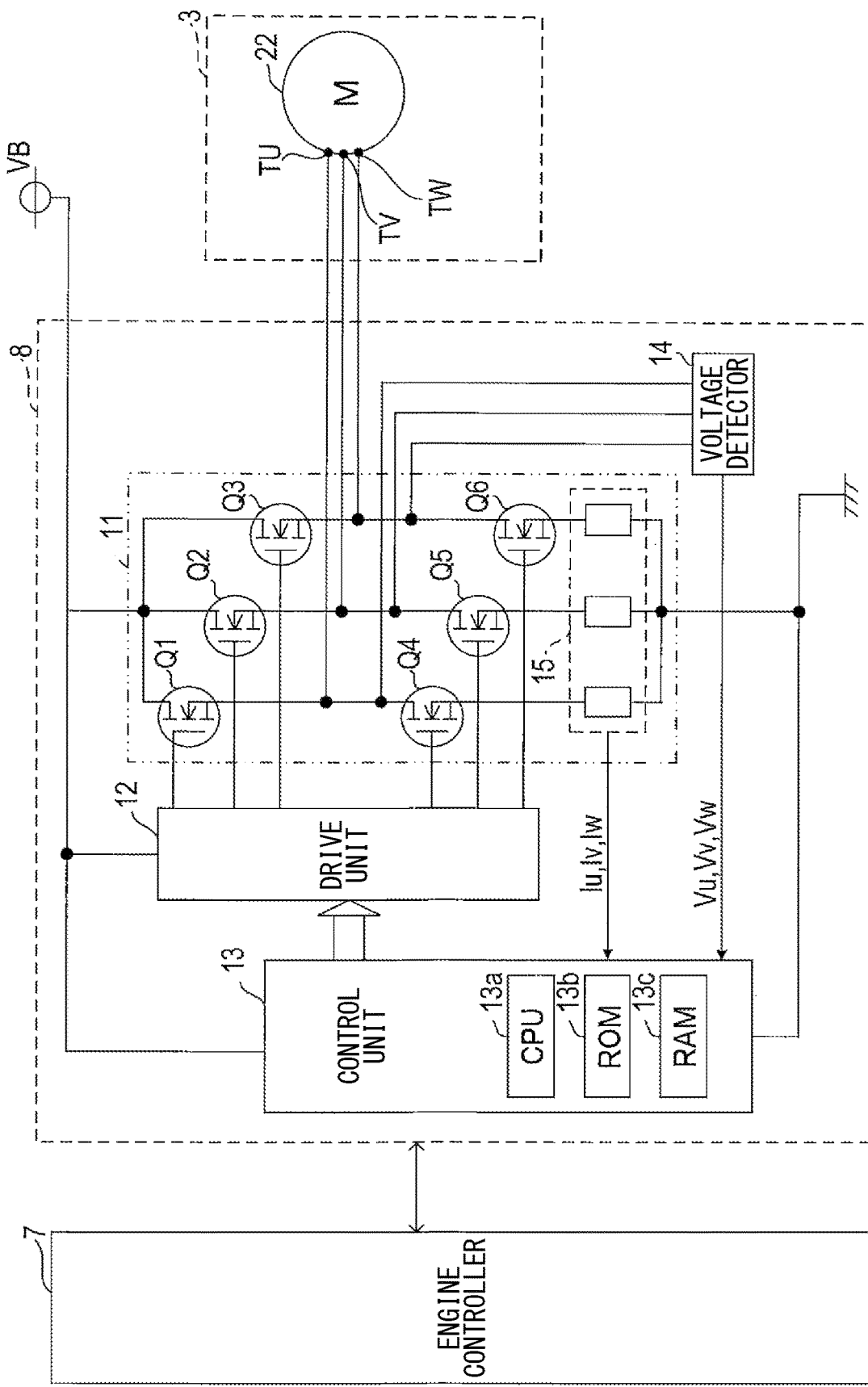
FIG. 2 is a block diagram illustrating a configuration of a fuel pump and a fuel pump controller.

The fuel pump controller 8 controls the fuel pump 3 based on a command from the engine controller 7. As shown in FIG. 2, the fuel pump 3 has a pump motor 22. In the present embodiment, the pump motor 22 is a three-phase brushless motor.

The fuel pump controller 8 includes an inverter circuit 11, a drive unit 12 and a control unit 13. The inverter circuit 11 receives power supply from a battery (not shown) and applies a battery voltage VB between the terminals TU, TV, TW of the pump motor 22 (between U-phase and V-phase, between V-phase and W-phase, and between W-phase and U-phase) to energize the stator coil so as to rotate the pump motor 22.

The U-phase, V-phase and W-phase stator coils of the pump motor 22 are connected in a Y-connection. The inverter circuit 11 is connected to the three terminals TU, TV, TW opposite to the Y-connection. The inverter circuit 11 includes a three-phase full-bridge circuit having six switching elements Q1, Q2, Q3, Q4, Q5, and Q6.

The switching elements Q1, Q2, and Q3 are disposed as so-called high-side switches between the positive electrode side of the battery and the terminals TU, TV, and TW of the pump motor 22. The switching elements Q4, Q5, and Q6 are disposed as so-called low-side switches between the negative electrode side of the battery and the terminals TU, TV, and TW of the pump motor 22.

Therefore, in the inverter circuit 11, the battery voltage VB is applied between any of the terminals TU, TV, and TW of the pump motor 22 by turning on one high-side switch and one low-side switch having different phases.

The terminal to which the battery voltage VB is applied and the application direction of the battery voltage VB can be switched by switching the switching element to be turned on. The current flowing through the pump motor 22 can be controlled by controlling the ON time of the switching element.

The drive unit 12 turns on or off the switching elements Q1 to Q6 in the inverter circuit 11 in accordance with the control signal output from the control unit 13. Thus, current flows through the U, V, W phase stator coil of the pump motor 22, thereby rotating the pump motor 22.

The control unit 13 is an electronic control unit including as a main component a microcontroller having a CPU 13a, a ROM 13b, a RAM 13c, and the like. Various functions of the microcontroller are realized by causing the CPU 13a to execute programs stored in a non-transitory tangible storage medium. The ROM 13b corresponds to a non-transitory tangible storage medium in which the programs are stored. A method corresponding to the program is executed by executing the program. Note that a part or all of the functions to be executed by the CPU 13a may be configured as hardware by one or multiple ICs or the like. The number of microcontrollers configuring the control unit 13 may be one or multiple.

The control unit 13 controls the current flowing through the U, V, W phase stator coil so that the target rotation speed instructed by the engine controller 7 matches the rotation speed of the pump motor 22 (the motor rotation speed). The target rotation speed is set so that the pressure of the fuel flowing in the fuel pipe 5 becomes a predetermined pressure.

The fuel pump controller 8 further includes a voltage detector 14 and a current detection unit 15. The voltage detector 14 detects the voltage Vu, Vv, Vw of the terminal TU, TV, TW of the pump motor 22. The current detection unit 15 detects the current Iu, Iv, Iw flowing through the U, V, W phase stator coil.

The detection signal of the voltage detector 14 and the detection signal of the current detection unit 15 are input to the control unit 13 and used for controlling the pump motor 22 and detecting abnormality. The control unit 13 turns on one high-side switch and one low-side switch having different phases in order to rotate the pump motor 22. In the present embodiment, the control unit 13 rotates the pump motor 22 by performing pulse width modulation control (hereinafter, PWM control). Specifically, for example, the control unit 13 maintains one of the two switching elements to be turned on in the on state, and periodically switches the other switching element between the on state and the off state in accordance with the duty.

In order to rotate the pump motor 22, the control unit 13 switches the switching element to be turned on in synchronization with the rotational position of the pump motor 22. In order to control the drive unit 12 in synchronization with the rotational position of the pump motor 22, the control unit 13 detects the rotational position of the pump motor 22. Specifically, the control unit 13 detects the rotational position of the pump motor 22 based on the voltage Vu, Vv, Vw acquired from the voltage detector 14. The control unit 13 generates a drive command based on the detected rotational position and outputs the drive command to the drive unit 12. Thus, the control unit 13 can control the pump motor 22 in synchronization with the rotational position of the pump motor 22.

Figure 3:
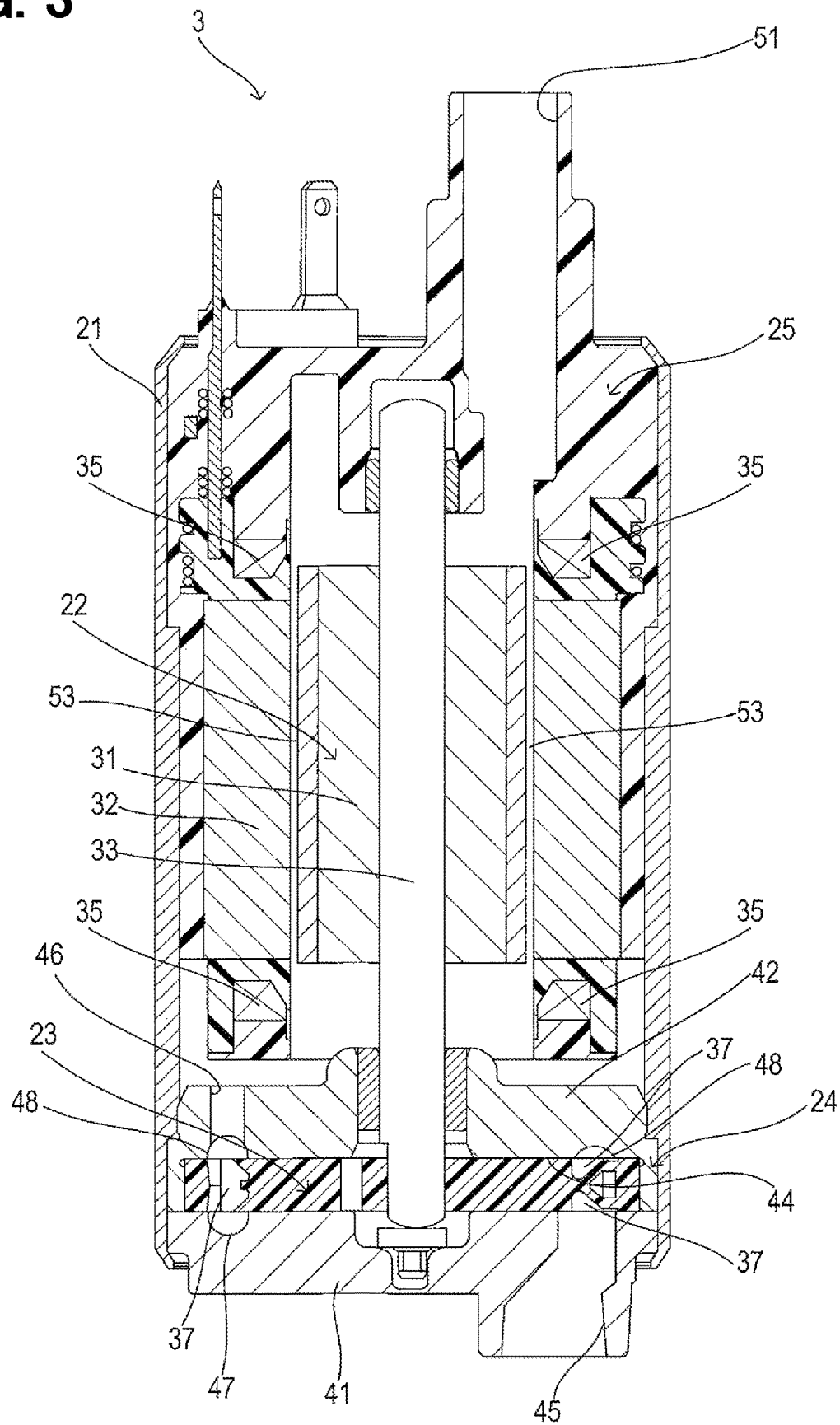
FIG. 3 is a sectional view illustrating the fuel pump.

As shown in FIG. 3, the fuel pump 3 includes a pump housing 21, a pump motor 22, an impeller 23, a pump case 24, and a motor cover 25. The pump housing 21 is a metal member formed in a cylindrical shape.

The pump motor 22 includes a rotor 31, a stator 32, and a shaft 33. The rotor 31 includes a cylindrical iron core and plural pairs of magnetic poles. A permanent magnet is used for the pair of magnetic poles. The pair of magnetic poles are arranged so that the N poles and the S poles are alternately and uniformly arranged on the outer periphery of the iron core.

The stator 32 is disposed at equal angular intervals around the rotor 31, and the winding 35 is wound around the stator 32. A U-phase, V-phase, or W-phase winding 35 is wound around the stator 32. The shaft 33 is a metal member formed in an elongated cylindrical shape. The shaft 33 is fixed to the rotor 31 such that its axis coincides with the axis of the rotor 31.

The pump motor 22 is installed in the pump housing 21 such that the axis of the shaft 33 coincides with the cylindrical axis of the pump housing 21. The impeller 23 is a resin member formed in a disk shape. Blade grooves 37 are arranged on the outer periphery of the impeller 23 in the circumferential direction. The impeller 23 is fixed to the shaft 33 such that the axis thereof and the axis of the shaft 33 coincide with each other, and is disposed inside the pump housing 21 at a first end of the pump housing 21 formed in a cylindrical shape along the axial direction.

The pump case 24 includes a first casing 41 and a second casing 42. The first casing 41 is installed to close the opening of the pump housing 21 at the first end of the pump housing 21.

The second casing 42 is installed inside the pump housing 21 so as to be in contact with the first casing 41 on the internal side. A recess 44 is formed in the second casing 42 on a side facing the first casing 41. The impeller 23 is rotatably housed in the recess 44.

The first casing 41 has a suction hole 45 passing through the first casing 41 along the axial direction of the pump housing 21. The opening of the suction hole 45 facing the second casing 42 is formed so as to face a part of the blade grooves 37 of the impeller 23.

The second casing 42 includes a discharge hole 46 passing through the second casing 42 along the axial direction of the pump housing 21. The opening of the discharge hole 46 facing the first casing 41 is formed so as to face a part of the blade grooves 37 of the impeller 23. The discharge hole 46 is disposed so as not to face the suction hole 45 along the axial direction of the pump housing 21.

The first casing 41 has a first flow groove 47 for allowing fuel to flow on a surface thereof facing the second casing 42. The first flow groove 47 is formed in an annular shape so as to face a part of the blade grooves 37 of the impeller 23. The first end of the annular first flow groove 47 faces the suction hole 45, and the second end of the first flow groove 47 faces the discharge hole 46.

In the recess 44 of the second casing 42, a second flow groove 48 for allowing fuel to flow is formed on the surface facing the first casing 41. The second flow groove 48 is formed in an annular shape so as to face a part of the blade grooves 37 of the impeller 23. The first end of the annular second flow groove 48 faces the suction hole 45, and the second end of the second flow groove 48 faces the discharge hole 46.

When the impeller 23 rotates and the fuel is pumped up from the suction hole 45, the fuel flows through a fuel flow path formed by the first flow groove 47, the second flow groove 48 and the blade groove 37. When the fuel reaches the second ends of the first flow groove 47 and the second flow groove 48, the fuel is discharged from the discharge hole 46.

The motor cover 25 fixes the pump motor 22 in the pump housing 21. The motor cover 25 is installed so as to close the opening of the pump housing 21 at the second end of the pump housing 21 formed in a cylindrical shape along the cylindrical axial direction.

The motor cover 25 includes a discharge hole 51 passing through the motor cover 25 along the axial direction of the pump housing 21. The fuel discharged from the discharge hole 46 of the pump case 24 is guided to the discharge hole 51 of the motor cover 25 through a fuel passage 53 formed between the rotor 31 of the pump motor 22 and the stator 32. Then, the fuel guided to the discharge hole 51 is discharged from the discharge hole 51 to the outside of the fuel pump 3.

Next, the procedure of vapor lock sign detection process executed by the CPU 13a of the control unit 13 will be described. The vapor lock sign detection process is executed each time a preset execution cycle (for example, 1 ms) elapses while the control unit 13 is operating.

Figure 4:
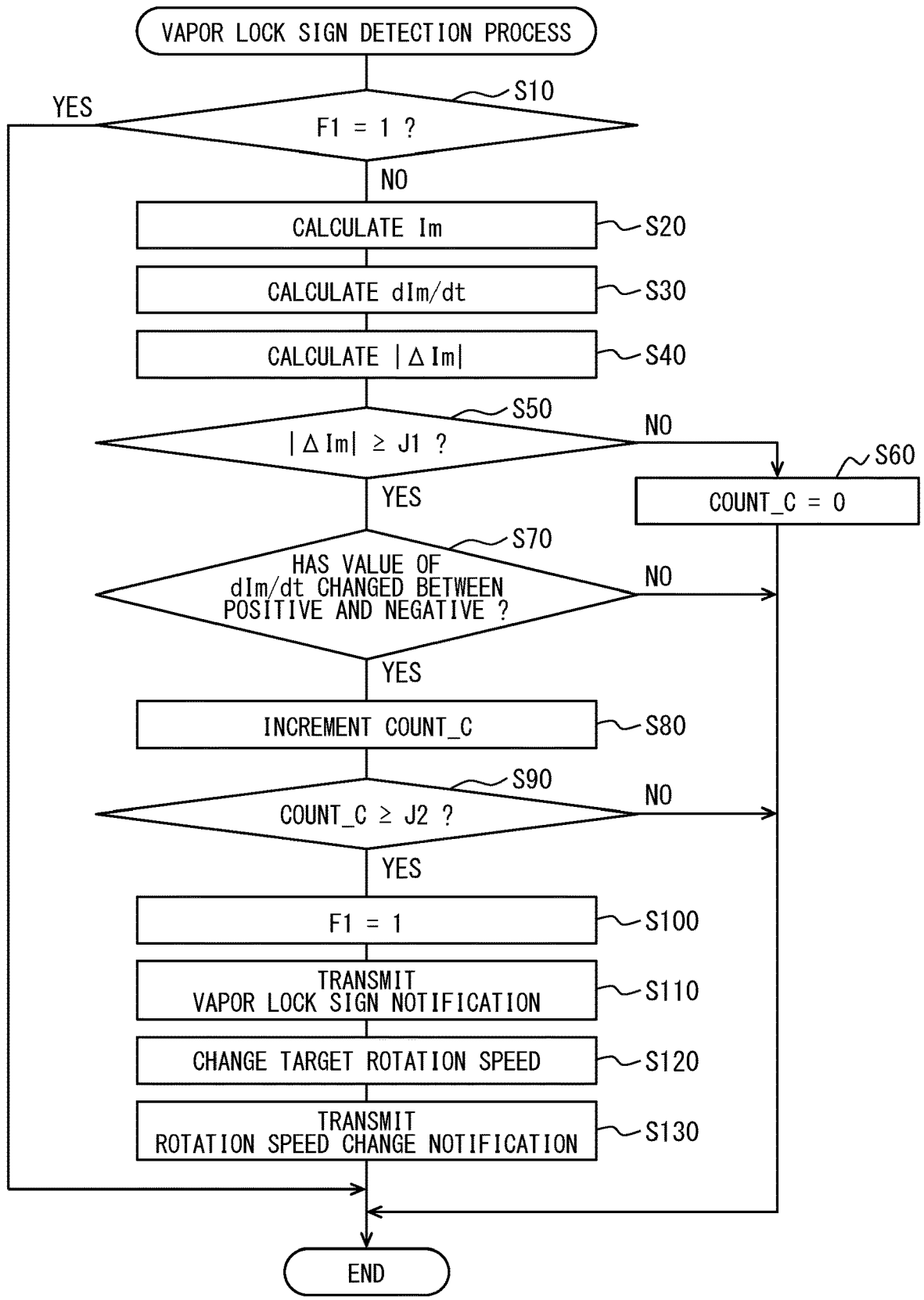
FIG. 4 is a flowchart illustrating a vapor lock sign detection process according to a first embodiment.

When the vapor lock sign detection process is executed, as shown in FIG. 4, the CPU 13a determines in S10 whether or not a sign detection flag F1 is set. In the following description, the setting of a flag indicates that a value of the flag is set to be "1", and the clearing of the flag indicates that the value of the flag is set to be "0".

If the sign detection flag F1 is set, the CPU 13a ends the vapor lock sign detection process. When the sign detection flag F1 is not set, the CPU 13a calculates the value of current flowing through the pump motor 22 (hereinafter referred to as motor current value Im) in S20, and stores the calculated motor current value Im in the RAM 13c. Specifically, the CPU 13a acquires the current detection signal from the current detection unit 15, and calculates the motor current effective value of the pump motor 22 based on the current detection value for one cycle when the pump motor 22 makes one rotation. The motor current effective value is stored in the RAM 13c as the motor current value Im. The RAM 13c stores the motor current value Im for the most recent 60 ms. That is, the RAM 13c stores the motor current values Im before the present moment by 0 ms, 1 ms, 2 ms, . . . 59 ms and 60 ms.

In S30, the CPU 13a calculates a motor current change rate dIm/dt. Specifically, the CPU 13a sets the oldest motor current value Im to the oldest current value I1 among the motor current values Im for the most recent 60 ms stored in the RAM 13c, and sets the newest motor current value Im to the latest current value I2. The motor current change rate dIm/dt is calculated by dIm/dt=(I1−I2)/0.06.

Further, the CPU 13a calculates the motor current difference |ΔIm| in S40. Specifically, the CPU 13a calculates the absolute value of the subtracted value obtained by subtracting the latest current value I2 from the oldest current value I1 as the motor current difference |ΔIm|.

Then, in S50, the CPU 13a determines whether the motor current difference |ΔIm| is equal to or greater than a preset sign determination current value J1 (for example, 0.5 A). If the motor current difference |ΔIm| is less than the sign determination current value J1, the CPU 13a resets the positive/negative switching number COUNT_C (that is, COUNT_C=0) in S60, and terminates the vapor lock sign detection process.

If the motor current difference |ΔIm| is equal to or greater than the preset sign determination current value J1, in S70, the CPU 13a determines whether the present motor current change rate dIm/dt calculated in S30 has changed in positive/negative (reversed between plus and minus), compared with the 1 ms-before motor current change rate dIm/dt. That is, in S70, the CPU 13a determines whether the motor current value Im has changed from an increase to a decrease or from a decrease to an increase.

If the motor current change rate dIm/dt does not change in positive/negative between the current-time value and the 1 ms-before value, the CPU 13a terminates the vapor lock sign detection process. If the motor current change rate dIm/dt changes in positive/negative between the present-time value and the 1 ms-before value, the CPU 13a increments the positive/negative switching number COUNT_C in S80.

Then, in S90, the CPU 13a determines whether the positive/negative switching number COUNT_C is equal to or greater than a preset sign determination times J2 (for example, 5 times). When the positive/negative switching number COUNT_C is less than the sign determination times J2, the CPU 13a terminates the vapor lock sign detection process. When the positive/negative switching number COUNT_C is equal to or greater than the sign determination times J2, the CPU 13a sets the sign detection flag F1 in S100. Further, in S110, the CPU 13a transmits a vapor lock sign notification indicating that a sign of vapor lock has occurred to the engine controller 7. The engine controller 7 that has received the vapor lock sign notification transmits a vapor lock sign notification to a meter control device that controls the meter panel that displays the vehicle state and the like to the driver. Upon receiving the vapor lock sign notification, the meter control device displays on the meter panel that the sign of vapor lock occurs. This allows the driver of the vehicle to recognize that the fuel pump 3 is showing a sign of vapor lock.

Next, in S120, the CPU 13a sets a target rotation speed of a feedback control of the pump motor 22 to a preset vapor lock recovery rotation speed. An optimum value is set for the vapor lock recovery rotation speed according to the configuration of the fuel supply system 1.

Further, in S130, the CPU 13a transmits a rotation speed change notification indicating that the target rotation speed for feedback control has been changed to the engine controller 7, and terminates the vapor lock sign detection process.

Next, the procedure of vapor lock recovery determination process executed by the CPU 13a of the control unit 13 will be described. The vapor lock recovery determination process is executed each time a preset execution cycle (for example, 1 ms) elapses while the control unit 13 is operating.

Figure 5:
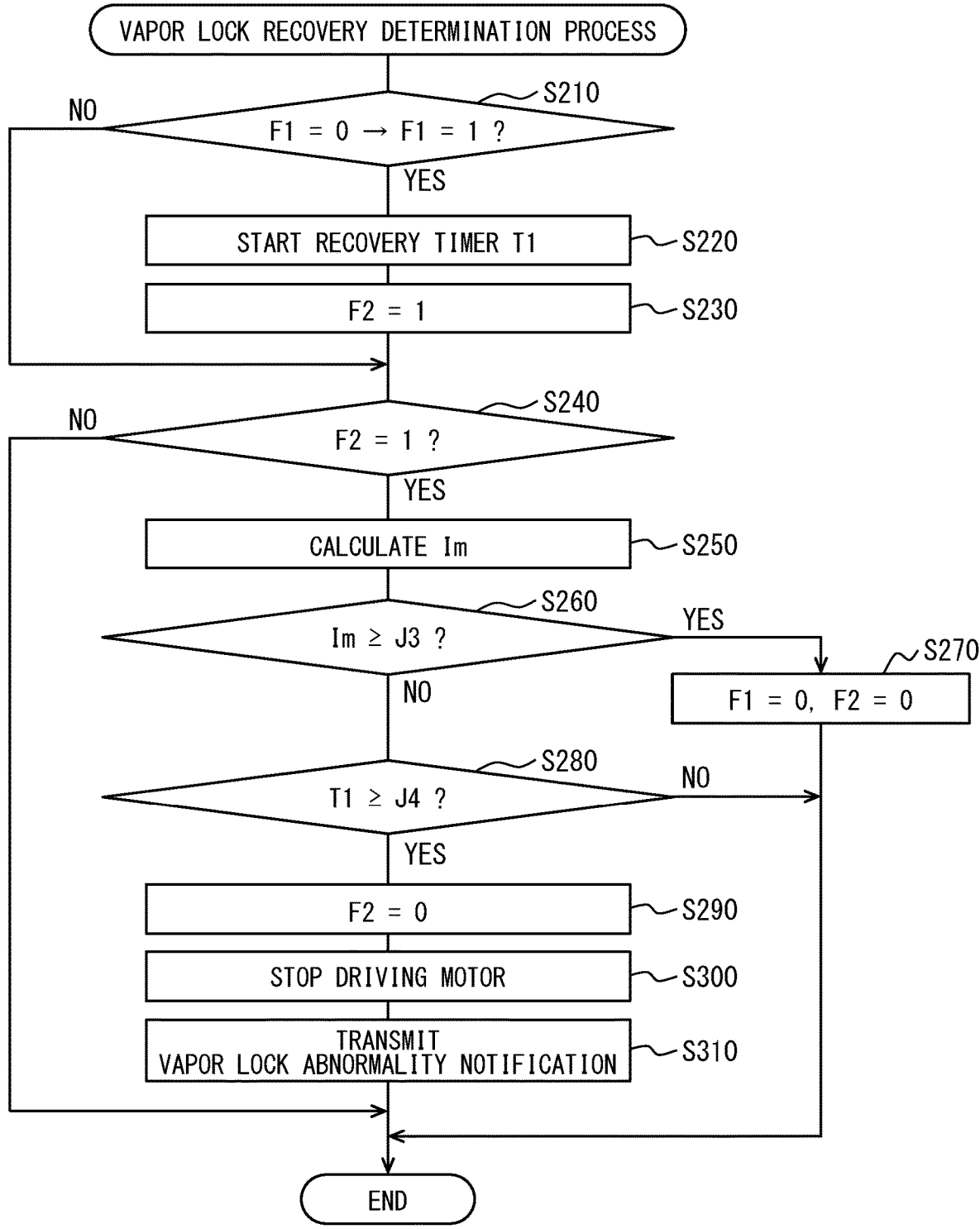
FIG. 5 is a flowchart showing a vapor lock recovery determination process.

When the vapor lock recovery determination process is executed, as shown in FIG. 5, in S210, the CPU 13a determines whether the sign detection flag F1 is set from the cleared state. If the sign detection flag F1 is not changed from being cleared to being set, the CPU 13a proceeds to S240.

If the state in which the sign detection flag F1 is cleared changes to the state in which the sign detection flag F1 is set, the CPU 13a starts the recovery timer T1 in S220. The recovery timer T1 increments, for example, every 1 ms, and its value is incremented from 0 when activated.

Further, the CPU 13a sets the recovery determination flag F2 in S230, and proceeds to S240. After shifting to S240, the CPU 13a determines whether or not the recovery determination flag F2 is set. When the recovery determination flag F2 is not set, the CPU 13a terminates the vapor lock recovery determination process.

When the recovery determination flag F2 is set, the CPU 13a calculates the motor current value Im in S250 in the same manner as in S20. Then, in S260, the CPU 13a determines whether or not the motor current value Im calculated in S250 is equal to or greater than a preset recovery determination current value J3. If the motor current value Im is equal to or greater than the recovery determination current value J3, the CPU 13a clears the sign detection flag F1 and the recovery determination flag F2 in S270, and terminates the vapor lock recovery determination process.

If the motor current value Im is less than the recovery determination current value J3, the CPU 13a determines in S280 whether or not the value of the recovery timer T1 is equal to or greater than a preset recovery determination time equivalent value J4. The recovery determination time equivalent value J4 is set to a value corresponding to the recovery determination time.

When the value of the recovery timer T1 is less than the recovery determination time equivalent value J4, the CPU 13a terminates the vapor lock recovery determination process. When the value of the recovery timer T1 is equal to or greater than the recovery determination time equivalent value J4, the CPU 13a clears the recovery determination flag F2 in S290.

Further, the CPU 13a stops driving the pump motor 22 in S300. Further, in S310, the CPU 13a transmits a vapor lock abnormality notification indicating that the vapor lock could not be resolved to the engine controller 7, and terminates the vapor lock recovery determination process.

Figure 6:
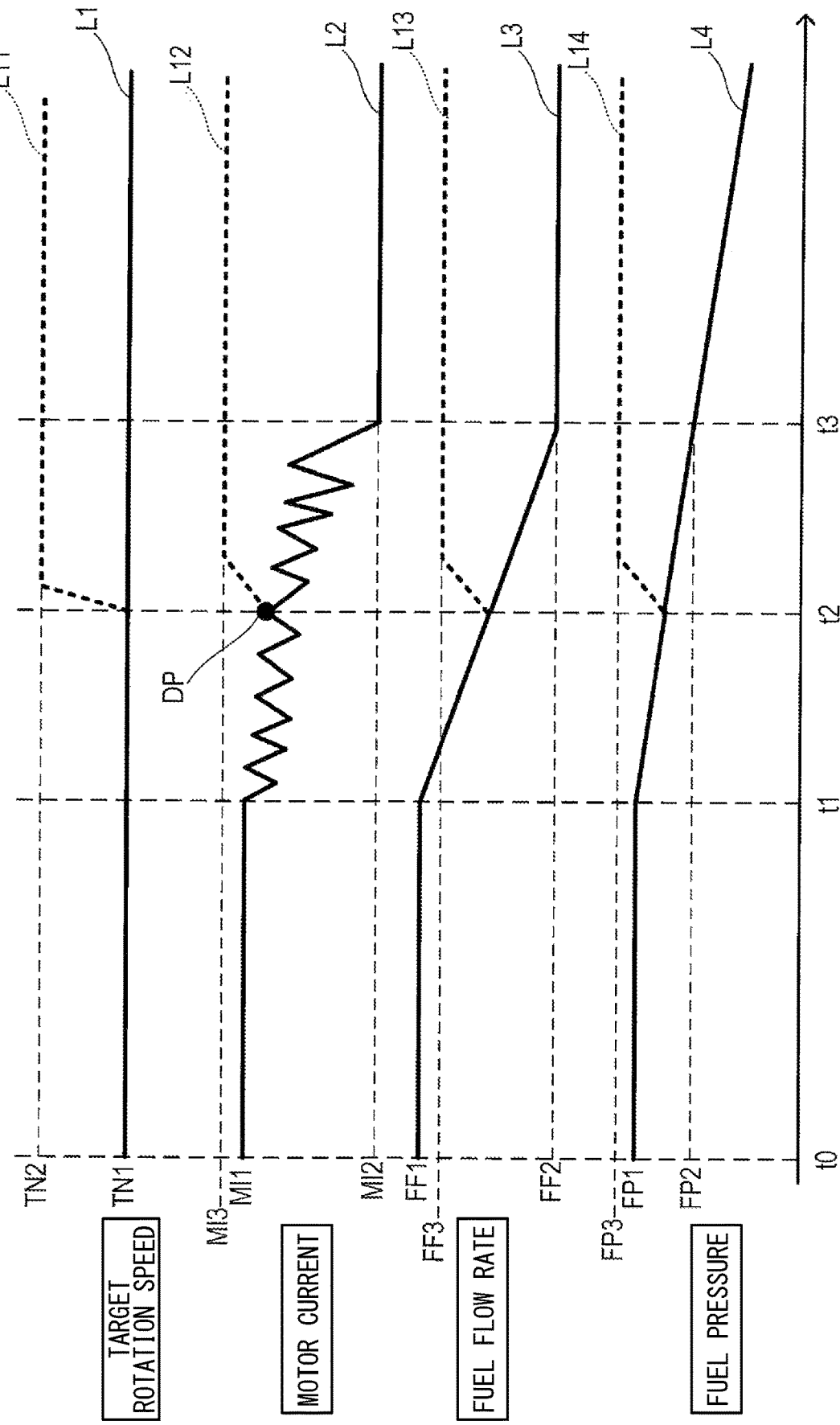
FIG. 6 is a timing chart showing a specific example of vapor lock sign determination and vapor lock recovery.

Next, a specific example process of determining the sign of vapor lock and a specific example process of unlocking the vapor will be described. As shown by solid lines L1, L2, L3, and L4 in FIG. 6, assume that the target rotation speed of the pump motor 22 is TN1 [rpm], the motor current value Im is MI1 [A], the flow rate of fuel is FF1 [L/h] and the fuel pressure is FP1 [kPa].

It is assumed that at time t1, vapor generated by partially evaporating fuel in the suction filter 4 begins to be sucked into the fuel pump 3 through the suction hole 45 of the fuel pump 3. The vapor sucked from the suction hole 45 flows through the fuel passage while being held in one or more blade grooves 37 of the impeller 23 and is discharged from the discharge hole 46. Similarly, the fuel sucked from the suction hole 45 flows through the fuel passage while being held in one or more blade grooves 37 of the impeller 23 and is discharged from the discharge hole 46. When the vapor flows through the fuel passage, the load applied to the impeller 23 is reduced and the motor current value Im is reduced compared with a case where the fuel flows through the fuel passage.

When vapor is generated in the suction filter 4, the vapor and the fuel are alternately sucked through the suction hole 45 in repeated manner. Therefore, as indicated by the solid line L2 from time t1 to time t3, the motor current value Im decreases as vapor is drawn in from the suction hole 45, and increases as fuel is drawn in from the suction hole 45. When the increase and the decrease in the motor current value Im are repeated, the motor current value Im oscillates.

Further, the amount of vapor present in the fuel passage 53 increases as the vapor is discharged from the discharge hole 46. As a result, as indicated by the solid lines L3 and L4 from time t1 to time t3, the fuel flow rate and the fuel pressure gradually decrease.

Since the fuel pressure in the fuel pump 3 gradually decreases, the load applied to the impeller 23 also gradually decreases while the impeller 23 is rotating to discharge the fuel from the discharge hole 46. Therefore, as indicated by the solid line L2 from time t1 to time t3, the motor current value Im gradually decreases while oscillating as an entire tendency.

Then, at time t3, it is assumed that all the fuel in the fuel pump 3 is replaced with vapor, causing a vapor lock. As indicated by the solid lines L2, L3, and L4 at time t3, when the vapor lock occurs, the motor current value Im, the fuel flow rate, and the fuel pressure are MI2 [A], FF2 [L/h], and FP2 [kPa], respectively.

As indicated by the solid lines L2, L3, and L4 after time t3, when the vapor lock occurs, the motor current value Im continues to maintain MI2 [A], the fuel flow rate continues to maintain FF2 [L/h], and the fuel pressure continues to decrease from FP2 [kPa].

While the motor current difference |ΔIm| continues to be equal to or greater than the sign determination current value J1, if the number of times the motor current change rate dIm/dt changes in positive/negative becomes equal to or greater than the sign determination times J2, a sign of vapor lock is detected, as indicated by a detection point DP.

When the sign of vapor lock is detected, as indicated by the dashed line L11 after time t2, the target rotation speed is set to TN2 [rpm] corresponding to a vapor lock recovery speed in S120.

As indicated by the dashed lines L12, L13, and L14 after time t2, by setting the target rotation speed to TN2 [rpm], the motor current value Im increases to MI3 [A], the fuel flow rate increases to FF3 [L/h], and the fuel pressure increases to FP3 [kPa], such that the vapor lock is eliminated.

The fuel pump controller 8 controls the pump motor 22 that drives the fuel pump 3 to pump up the fuel. The fuel pump controller 8 is configured to detect a sign of vapor lock, which is an abnormality in which the fuel pump 3 is unable to discharge fuel due to filling of the fuel pump 3 inside the fuel pump 3.

Further, the fuel pump controller 8 is configured to change the motor rotation speed of the pump motor 22 so that the vapor existing inside the fuel pump 3 is reduced when a sign of vapor lock is detected.

Since the fuel pump controller 8 can execute measures for avoiding the occurrence of vapor lock before the vapor lock occurs, it is possible to restrict the occurrence of vapor lock more effectively compared with a case where the measures are executed after the occurrence of vapor lock. As a result, the fuel pump controller 8 can suppress the occurrence of a situation in which the fuel pump 3 cannot pump up fuel, and the reliability of the fuel pump 3 can be improved.

Further, the fuel pump controller 8 detects a sign of vapor lock when the vibration determination condition is satisfied, which indicates that the motor current value Im oscillates with an amplitude equal to or greater than the preset sign determination current value J1 with the lapse of time. The vibration determination condition is that the motor current change rate dIm/dt changes in positive/negative by the sign determination times J2 or more, while the motor current difference |ΔIm| is equal to or greater than the sign determination current value J1.

Further, when the fuel pump controller 8 changes the motor rotation speed of the pump motor 22 due to detection of a sign of vapor lock, the fuel pump controller 8 notifies the engine controller 7 that the motor rotation speed has been changed. When the fuel pump controller 8 detects a sign of vapor lock, the fuel pump controller 8 notifies the engine controller 7 that a sign of vapor lock has occurred.

Thereby, the engine controller 7 can recognize that a sign of vapor lock has occurred. The engine controller 7, which has recognized the sign of vapor lock from the notification from the fuel pump controller 8, checks whether fuel is stored in the fuel pump 3 or not. Then, when no fuel is stored in the fuel pump 3, the engine controller 7 can determine that the cause of the sign of vapor lock is lack of gas.

Further, the fuel pump controller 8 stops the driving of the pump motor 22, if the vapor cannot be unlocked, after a preset recovery determination time has elapsed while the rotation speed of the pump motor 22 is changed in response to the detection of the sign of vapor lock. As a result, the fuel pump controller 8 can restrict the pump motor 22 from being damaged due to the pump motor 22 continuing to rotate while the fuel pump 3 cannot pump up fuel.

Further, the fuel pump controller 8 notifies the engine controller 7 that the vapor lock could not be resolved if the vapor cannot be unlocked, after a preset recovery determination time has elapsed while the rotation speed of the pump motor 22 is changed in response to the detection of the sign of vapor lock. As a result, when a vapor lock occurs, the fuel pump controller 8 causes the engine controller 7 to execute processing for coping with the vapor lock, or makes the driver of the vehicle recognize that an abnormality has occurred.

In the embodiment, the fuel pump controller 8 corresponds to a motor control device, and the pump motor 22 corresponds to a motor. Further, S20 to S100 correspond to a sign detection unit, the sign determination current value J1 corresponds to a sign determination value, S120 corresponds to a vapor suppression unit, S130 corresponds to a change notification unit, and S110 corresponds to a sign notification unit.

Further, S300 corresponds to a stopping unit for an abnormal time, and S310 corresponds to an abnormality notification unit.

Second Embodiment

Hereinafter, a second embodiment of the present disclosure will be described with reference to the drawings. Note that in the second embodiment, portions different from the first embodiment are described. Common configurations are denoted by the same reference numerals.

Figure 7:
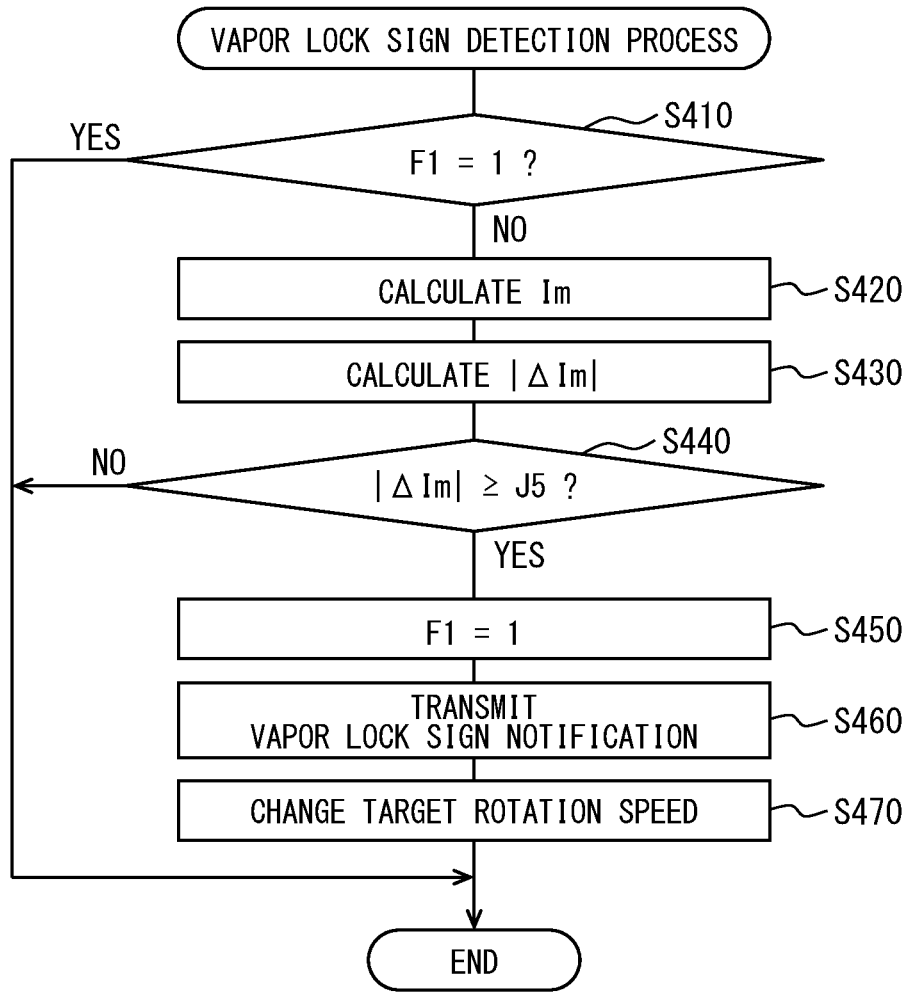
FIG. 7 is a flowchart showing a vapor lock sign detection process according to a second embodiment.

The fuel supply system 1 of the second embodiment differs from that of the first embodiment in that the vapor lock sign detection process is modified. When the vapor lock sign detection process of the second embodiment is executed, as shown in FIG. 7, the CPU 13a determines in S410 whether or not the sign detection flag F1 is set.

If the sign detection flag F1 is set, the CPU 13a ends the vapor lock sign detection process. If the sign detection flag F1 is not set, the CPU 13a calculates the motor current value Im in S420 in the same manner as in S20, and stores the calculated motor current value Im in the RAM 13c. The RAM 13c stores the motor current value Im for the most recent 30 ms. That is, the RAM 13c stores the motor current values Im, every 1 ms, from 0 ms to 30 ms before.

Next, the CPU 13a calculates the motor current difference |ΔIm| in S430. Specifically, the CPU 13a sets the oldest motor current value Im to the oldest current value I1 among the motor current values Im for the most recent 30 ms stored in the RAM 13c, and sets the newest motor current value Im to the latest current value I2. The CPU 13a calculates the absolute value of the subtracted value obtained by subtracting the latest current value I2 from the oldest current value I1 as the motor current difference |ΔIm|.

Then, in S440, the CPU 13a determines whether or not the motor current difference |ΔIm| is equal to or greater than a preset sign determination current value J5 (for example, 1 A). When the motor current difference |ΔIm| is less than the sign determination current value J5, the CPU 13a terminates the vapor lock sign detection process.

When the motor current difference |ΔIm| is equal to or greater than the sign determination current value J5, the CPU 13a sets the sign detection flag F1 in S450. Further, in S460, the CPU 13a transmits to the engine controller 7 a vapor lock sign notification indicating that a side of vapor lock.

Next, in S470, the CPU 13a sets the target rotation speed of the feedback control of the pump motor 22 to the preset vapor lock recovery rotation speed in the same manner as in S120, and terminates the vapor lock sign detection process.

The fuel pump controller 8 is configured to detect a sign of vapor lock, which is an abnormality in which the fuel pump 3 is unable to discharge fuel due to filling of the fuel pump 3 inside the fuel pump 3. Further, the fuel pump controller 8 is configured to change the motor rotation speed of the pump motor 22 so that the vapor existing inside the fuel pump 3 is reduced when a sign of vapor lock is detected.

Then, the fuel pump controller 8 determines that a sign of vapor lock has occurred when a sudden change determination condition indicating that the motor current value Im has suddenly decreased is satisfied. The sudden change determination condition is that the motor current difference |ΔIm| is equal to or greater than the sign determination current value J5.

Since the fuel pump controller 8 can execute measures for avoiding the occurrence of vapor lock before the vapor lock occurs, it is possible to restrict the occurrence of vapor lock more effectively compared with a case where the measures are taken after the occurrence of vapor lock. As a result, the fuel pump controller 8 can suppress the occurrence of a situation in which the fuel pump 3 cannot pump up fuel, and the reliability of the fuel pump 3 can be improved.

In the embodiment, S420 to S450 correspond to a sign detection unit.

Third Embodiment

A third embodiment of the present disclosure will be described with reference to the drawings. In the third embodiment, portions different from those of the first embodiment will be described. Common configurations are denoted by the same reference numerals.

The fuel supply system 1 of the third embodiment differs from that of the first embodiment in that the vapor lock sign detection process is modified. The vapor lock sign detection process of the third embodiment is different from the first embodiment in that S20, S30, S40, S50 and S70 are omitted and S25, S35, S45, S55 and S75 are added.

Figure 8:
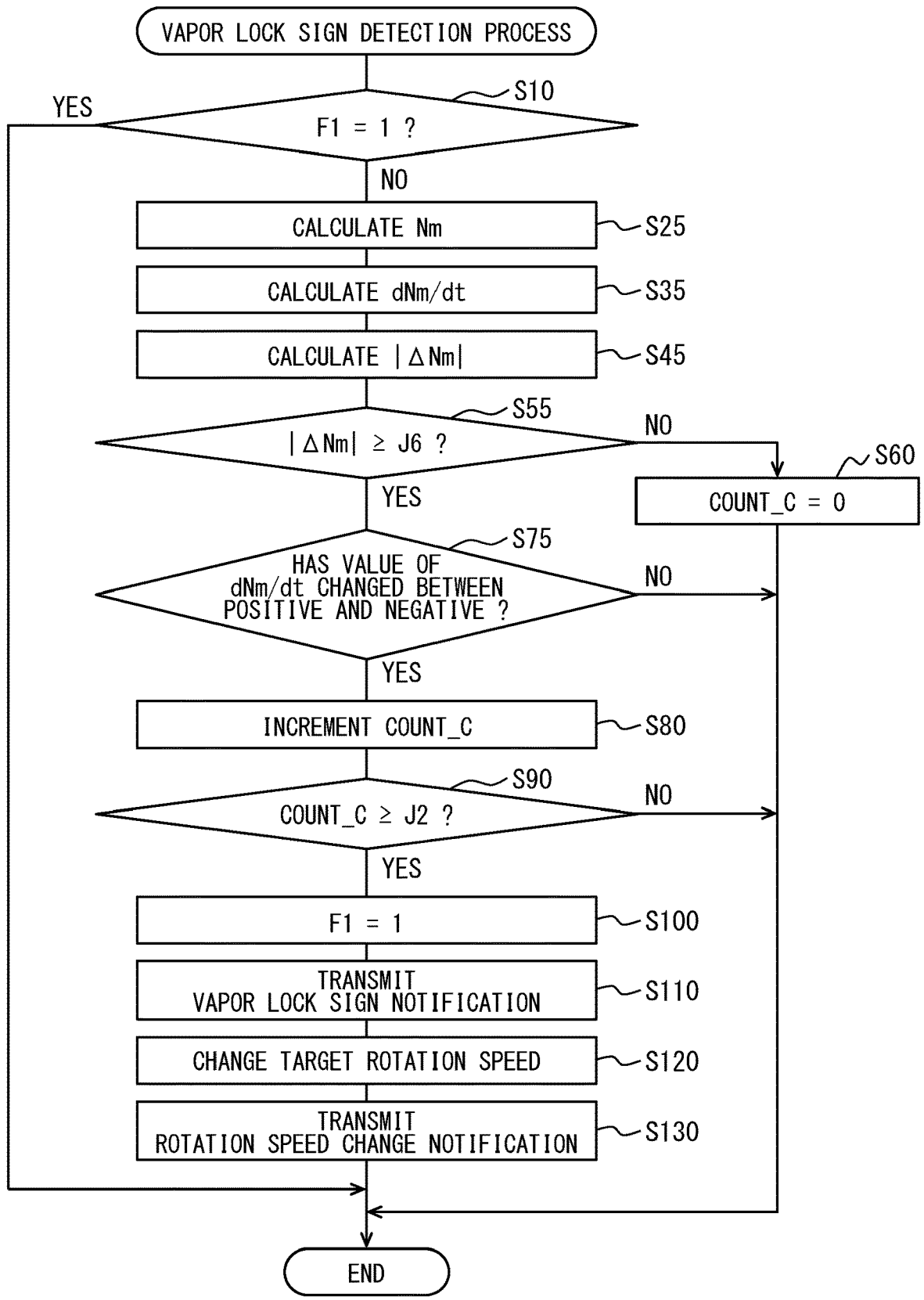
FIG. 8 is a flowchart showing a vapor lock sign detection process according to a third embodiment.

As shown in FIG. 8, when the sign detection flag F1 is not set in S10, the CPU 13a calculates the rotation speed of the pump motor 22 (hereinafter referred to as motor rotation speed Nm) in S25, and the calculated motor rotation speed Nm is stored in the RAM 13c. Specifically, the CPU 13a detects the rotation position of the pump motor 22 based on the voltages Vu, Vv, and Vw obtained from the voltage detector 14, thereby calculating the motor rotation speed Nm. The RAM 13c stores the motor rotation speed Nm for the most recent 60 ms, every 1 ms.

Then, in S35, the CPU 13a calculates the speed change rate dNm/dt. Specifically, the CPU 13a sets the oldest motor rotation speed Nm among the motor rotation speeds Nm for the most recent 60 ms stored in the RAM 13c as the oldest rotation speed N1, and sets the newest motor rotation speed Nm as the latest rotation speed N2. The CPU 13a calculates the speed change rate dNm/dt as dNm/dt=(N1−N2)/0.06.

Further, the CPU 13a calculates the motor rotation speed difference |ΔIm| in S45. Specifically, the CPU 13a calculates the absolute value of the subtraction value obtained by subtracting the latest rotation speed N2 from the oldest rotation speed N1 as the motor rotation speed difference |ΔIm|.

Then, in S55, the CPU 13a determines whether or not the motor rotation speed difference |ΔIm| is equal to or greater than a preset sign determination rotation speed J6. When the motor rotation speed difference |ΔIm| is less than the sign determination rotation speed J6, the CPU 13a proceeds to S60.

When the motor rotation speed difference |ΔIm| is larger than or equal to the preset sign determination rotation speed J6, the CPU 13a determines whether the speed change rate dNm/dt changes in positive/negative between the present time value calculated in S35 and the 1 ms-before value. That is, the CPU 13a determines in S75 whether or not the motor rotation speed Nm has changed from an increase to a decrease or from a decrease to an increase.

If the positive/negative sign of the speed change rate dNm/dt does not change between the current time value and the 1 ms-before value, the CPU 13a terminates the vapor lock sign detection process. If the positive/negative sign of the speed change rate dNm/dt changes between the current time value and the 1 ms-before value, the CPU 13a proceeds to S80.

The fuel pump controller 8 is configured to detect a sign of vapor lock, which is an abnormality in which the fuel pump 3 is unable to discharge fuel due to filling of the fuel pump 3 inside. Further, the fuel pump controller 8 is configured to change the motor rotation speed of the pump motor 22 so that the vapor existing inside the fuel pump 3 is reduced when a sign of vapor lock is detected.

The fuel pump controller 8 detects a sign of vapor lock when a vibration determination condition is satisfied, which indicates that the motor rotation speed Nm is vibrating with an amplitude equal to or greater than a preset sign determination rotation speed J6 with the passage of time. The vibration determination condition is that the positive/negative sign of the speed change rate dNm/dt changes by the sign determination times J2 or more while the motor rotation speed difference |ΔIm| is equal to or greater than the sign determination rotation speed J6.

Since the fuel pump controller 8 can execute measures for avoiding the occurrence of vapor lock before the vapor lock occurs, it is possible to restrict the occurrence of vapor lock more effectively compared with a case where the measures are taken after the occurrence of vapor lock. As a result, the fuel pump controller 8 can suppress the occurrence of a situation in which the fuel pump 3 cannot pump up fuel, and the reliability of the fuel pump 3 can be improved.

In the embodiment, S25 to S100 correspond to a sign detection unit, and the sign determination rotation speed J6 corresponds to a sign determination value.

Although the embodiment of the present disclosure has been described above, the present disclosure is not limited to the above embodiment, and various modifications can be made.

First Modification

In the above embodiment, the motor current effective value of the pump motor 22 is calculated based on the current detection value for one cycle in which the pump motor 22 rotates once, and this motor current effective value is used as the motor current value Im. However, the current value of the current flowing through the pump motor 22 (that is, the instantaneous motor current value) may be used as the motor current value Im.

Second Modification

In the second embodiment, it is determined that a sign of vapor lock has occurred when the sudden change determination condition indicating that the motor current value Im has suddenly decreased is satisfied. However, it may be determined that a sign of vapor lock has occurred when a sudden change determination condition indicating that the motor rotation speed Nm has increased abruptly is satisfied.

Third Modification

In the first embodiment, when the motor current value Im oscillates over time with an amplitude equal to or greater than the sign determination current value J1, it is determined that a sign of vapor lock has occurred. However, as described above, when there is a sign of vapor lock, the motor current value Im gradually decreases while vibrating as a whole. Therefore, in addition to the vibration determination condition indicating that the motor current value Im is vibrating with an amplitude equal to or greater than the sign determination current value J1 with the passage of time, it may be determined that a sign of vapor lock is generated when the motor current value Im gradually decreases. Similarly, in addition to the fact that the vibration determination condition indicating that the motor rotation speed Nm is vibrating with an amplitude equal to or greater than the sign determination rotation speed J6 with the passage of time, furthermore, it may be determined that a sign of vapor lock is generated when the motor rotation speed Nm gradually increases as a whole.

The control unit 13 and the techniques thereof according to the present disclosure may be implemented by one or more special-purposed computers. Such a special-purposed computer may be provided (i) by configuring (a) a processor and a memory programmed to execute one or more functions embodied by a computer program, or (ii) by configuring (b) a processor including one or more dedicated hardware logic circuits, or (iii) by configuring by a combination of (a) a processor and a memory programmed to execute one or more functions embodied by a computer program and (b) a processor including one or more dedicated hardware logic circuits. The computer program may store a computer-readable non-transitional tangible recording medium as an instruction to be executed by the computer. The technique for realizing the functions of each unit included in the control unit 13 does not necessarily need to include software, and all the functions may be realized using one or a plurality of hardware circuits.

The multiple functions of one component in the above embodiment may be realized by multiple components, or a function of one component may be realized by the multiple components. In addition, multiple functions of multiple components may be realized by one component, or a single function realized by multiple components may be realized by one component. Moreover, part of the configuration of the above embodiment may be omitted. At least a part of the configuration of the above embodiment may be added to or replaced with the configuration of another embodiment.

In addition to the fuel pump controller 8, the present disclosure may be implemented in various forms such as a system including the fuel pump controller 8 as a component, a program for causing a computer to function as the fuel pump controller 8, a non-transitory tangible recording medium such as a semiconductor memory storing the program, and an abnormality detection method.

What is claimed is:

1. A motor control device configured to control a motor that drives a fuel pump, comprising:
   a processor and memory configured to
   detect a sign of a vapor lock that is an abnormality in which the fuel pump is unable to discharge a fuel due to a vapor inside the fuel pump,
   change a rotation speed of the motor to reduce the vapor inside the fuel pump with the processor and memory detects the sign of the vapor lock, and
   detect the sign of the vapor lock when a vibration determination condition is satisfied, which indicates that a current value of the motor or the rotation speed of the motor oscillates with an amplitude equal to or greater than a preset sign determination value.

2. The motor control device according to claim 1, wherein the processor and memory detects the sign of the vapor lock when a sudden change determination condition is satisfied, which indicates that a current value of the motor flowing through the motor has decreased, or that the rotation speed of the motor has increased.

3. The motor control device according to claim 1, wherein the processor and memory is further configured to notify that the rotation speed of the motor has been changed when the processor changes the rotation speed of the motor.

4. The motor control device according to claim 1, wherein the processor and memory is further configured to notify the sign of the vapor lock when the processor and memory detects the sign of the vapor lock.

5. The motor control device according to claim 1, wherein the processor and memory is further configured to stop a driving of the motor when the vapor lock remains after a preset recovery determination time elapses since the processor and memory changes the rotation speed of the motor.

6. The motor control device according to claim 1, wherein the processor and memory is further configured to notify that the vapor lock remains when the vapor lock remains after a preset recovery determination time elapses since the processor and memory changes the rotation speed of the motor.

7. A motor control device configured to control a motor that drives a fuel pump, comprising:
   a computer including a processor and a memory that stores instructions configured to, when executed by the processor, cause the processor to
   detect a sign of a vapor lock that is an abnormality in which the fuel pump is unable to discharge a fuel due to a vapor inside the fuel pump,
   change a rotation speed of the motor to reduce the vapor inside the fuel pump when the sign of the vapor lock is detected, and
   notify that the vapor lock remains when the vapor lock remains after a preset recovery determination time elapses since a change of the rotation speed of the motor.

8. The motor control device according to claim 1, wherein the processor and memory is further configured to calculate an effective value of the current value of the motor, and detect the sign of the vapor lock in response to an oscillation in the effective value.

9. The motor control device according to claim 1, further comprising:
   a current sensor configured to detect a current flowing through a stator coil of the motor,
   wherein
   the processor acquires a current detection signal from the current sensor and calculates a current effective value of the motor based on the current detection signal to detect the sign of the vapor lock in response to the current effective value.

10. The motor control device according to claim 9, wherein the processor and memory is further configured to detect the sign of the vapor lock in response to an oscillation in the current effective value, and increase the rotation speed of the motor to avoid the vapor lock.

11. The motor control device according to claim 9, further comprising:
   a suction filter arranged near a suction hole of the pump, wherein
   the processor and memory is further configured to detect, based on the current effective value, that the vapor and the fuel are alternately sucked through the suction hole in repeated manner when the vapor is generated in the suction filter.

12. A motor control device configured to control a motor that drives a fuel pump, comprising:
   a processor and memory configured to
   detect a sign of a vapor lock that is an abnormality in which the fuel pump is unable to discharge a fuel due to a vapor inside the fuel pump,
   change a rotation speed of the motor to reduce the vapor inside the fuel pump when the processor and memory detects the sign of the vapor lock, and
   detect the sign of the vapor lock when a vibration determination condition is satisfied, which indicates that the rotation speed of the motor oscillates with an amplitude equal to or greater than a preset sign determination value.

* * * * *